United States Patent [19]
Van Duyne et al.

[11] 3,894,076
[45] July 8, 1975

[54] PRODUCTION OF ALKYL ESTERS OF UNSATURATED MONOCARBOXYLIC ACIDS

[75] Inventors: Roger L. Van Duyne, Seabrook; Adolfo Aguilo; Dudley J. McCracken, both of Corpus Christi, all of Tex.

[73] Assignee: Celanese Corporation, New York, N.Y.

[22] Filed: Jan. 24, 1974

[21] Appl. No.: 436,247

[52] U.S. Cl. ........................................ 260/486 R
[51] Int. Cl. ........................................ C01c 69/54
[58] Field of Search ........................... 260/486 R

[56] References Cited
UNITED STATES PATENTS
3,539,621  11/1970  Cipollone et al. ............ 260/486 R
3,703,539  11/1972  DiLiddo ....................... 260/486 R Primary Examiner—Robert Gerstl
Assistant Examiner—Paul J. Killos
Attorney, Agent, or Firm—Stewart N. Rice; Ralph M. Pritchett

[57] ABSTRACT

A process for producing an alkyl ester of an alpha-beta unsaturated monocarboxylic acid from an alpha-monoolefin and such monocarboxylic acid. The process involves, for example in producing ethyl acrylate from ethylene and acrylic acid, the reacting of ethylene with a sulfuric acid medium in an ethylation zone followed by reacting the product obtained in the ethylation zone with acrylic acid. The ethylene is introduced into the ethylation zone by recycling a portion of the liquid from the ethylation zone through a spray tower where there is effected a mass transfer of gaseous ethylene into liquid droplets of such recycled liquid. Following recovery of the ethyl acrylate, the sulfuric acid medium is recycled to the ethylation zone.

8 Claims, 2 Drawing Figures

3,894,076

PRODUCTION OF ALKYL ESTERS OF UNSATURATED MONOCARBOXYLIC ACIDS

BACKGROUND OF THE INVENTION

Processes for the production of simple polymerizable esters of alpha-beta unsaturated monocarboxylic acids by interacting such acids with alpha-monoolefins and sulfuric acid are well known. For example, such processes are disclosed in U.S. Pat. No. 3,703,539, issued Nov. 21, 1972 to DiLiddo and U.S. Pat. No. 3,539,621, issued Nov. 10, 1970 to Cipollone, et al. As described in such references and other references, the process is thought to involve the formation of intermediate sulfates from a reaction of the monoolefin with the sulfuric acid, which sulfates further react with the unsaturated acid to form the desired ester. Although the processes of the prior art may successfully be utilized to produce the desired esters, they generally require relatively large equipment sizes for the volumes processed because of the long residence times called for in many process steps, and also because of the use of large excesses of some reactants, particularly the alpha-monoolefin utilized. The use of large excesses of a reactant also, of course, result in the required use of relatively large recycle equipment so as to recover any excess reactant utilized. Long residence times are also undesirable because such can result in polymerization of the reactants, which in turn can cause plugging of process equipment.

It is thus an object of the present invention to provide a process for the production of esters of alpha-beta unsaturated monocarboxylic acids by interacting such acids with alpha-monoolefins in the presence of sulfuric acid. It is an additional object of the present invention to provide such a process which utilizes relatively short residence times and does not necessitate relatively large recycles of the unsaturated alpha-monoolefin. It is a particular object of the present invention to provide a process for the production of ethyl acrylate by the interaction of ethylene and acrylic acid in the presence of sulfuric acid. Additional objects will become apparent from the following description of the present invention.

SUMMARY OF THE INVENTION

These and other objects are accomplished by the present invention, which in one of its embodiments is a continuous process for the production of a lower alkyl ester of an alpha-beta unsaturated monocarboxylic acid in which ester the alcohol moiety contains from 2 to 4 carbon atoms, which process comprises: (a) in a mass transfer zone to which a gaseous alpha-monoolefin of 2 to 4 carbon atoms is supplied so as to maintain an atmosphere of said gaseous alpha-monoolefin as a continuous phase, effecting the mass transfer of said alpha-monoolefin into liquid droplets of a hereafter defined recycle stream recycled from the hereafter defined first reaction zone, so as to obtain an alpha-monoolefin enriched liquid, (b) in a first reaction zone mixing and reacting the alpha-monoolefin enriched liquid so obtained in said mass transfer zone with a substantially anhydrous sulfuric acid medium, said sulfuric acid medium being substantially comprised of the residual liquid recycled from the hereafter defined recovery zone together with make-up sulfuric acid, said first reaction zone being operated at a temperature within the range of about 100° to 160°C, and a pressure of about 100 to 300 psig, (c) withdrawing a portion of the reaction mixture from said first reaction zone and recycling such as said recycle stream to said mass transfer zone, (d) passing the reaction mixture obtained from said first reaction zone to a second reaction zone, adding to and reacting with such reaction mixture obtained in said first reaction zone an anhydrous alpha-beta unsaturated monocarboxylic acid containing three or four carbon atoms, said second reaction zone being operated at a temperature within the range of about 100° to 150°C and a pressure within the range of about 100 to 300 psig, (e) in a recovery zone treating the effluent from said second reaction zone so as to recover said lower alkyl ester of the alpha-beta unsaturated monocarboxylic acid therefrom, and (f) recycling at least a portion of the residual liquid from said separation zone to said first reaction zone; wherein said process is effected under substantially anhydrous conditions and wherein in said process the rate of circulation and recirculation of the various streams therein is such that the residence time of the liquid reactants in the loop comprised of said first reaction zone and said mass transfer zone is from 8 to 20 minutes, and such that the residence time of the reactants in said second reaction zone is from 9 to 16 minutes.

DETAILED DESCRIPTION OF THE INVENTION

The esters which may be produced by the present invention are those simple, polymerizable alkyl esters of an alpha-beta unsaturated monocarboxylic acid containing 3 or 4 carbon atoms, namely acrylic acid, methacrylic acid and vinylacetic acid (3-butenoic). The alcohol moiety of the esters of the present invention corresponds to that as would be derived from a monohydric alkanol of 2 to 4 carbon atoms, such as ethanol, the propanols and the butanols; however, in the present invention the alcohol moiety is actually derived from an alpha-monoolefin of 2 to 4 carbon atoms. Specific monoolefins useful in the present invention are ethylene, propylene, isobutylene and 1,2-n-butylene. The present invention is most useful in the production of ethyl acrylate from acrylic acid and ethylene.

In adding the unsaturated monocarboxylic acid to the process of the present invention, it should be added in an anhydrous form, such as in the glacial form, which is preferred, preferred; in the form of an anhydride. It is possible, although not preferred to utilize a nonaqueous, inert diluent (such as a hydrocarbon) along with the alpha-beta monocarboxylic acid. Also when the process is being utilized for the esterification of acrylic acid, beta-propiolactone and the polymers thereof can be utilized as the source of acrylic acid.

Figure 1:
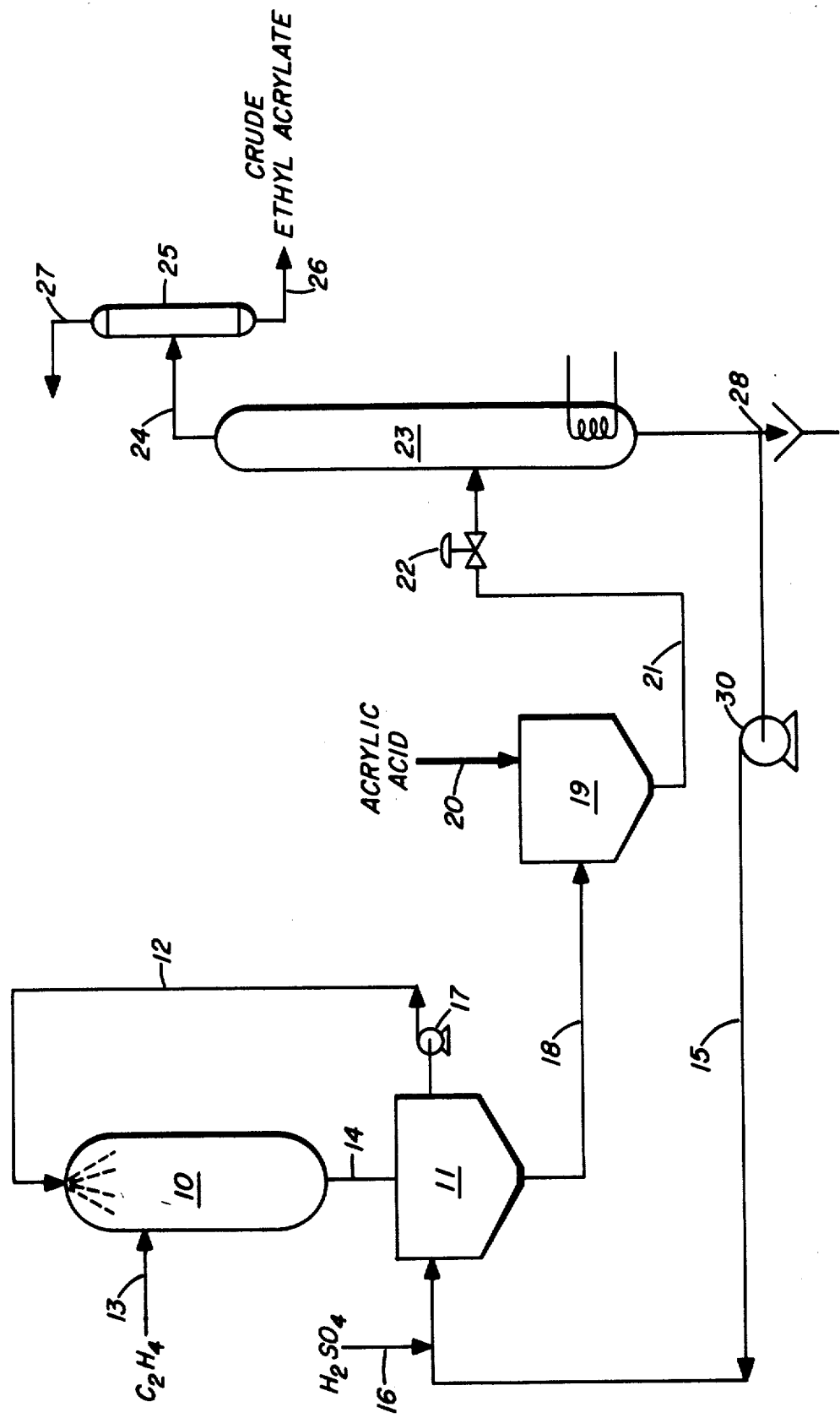
FIG. 1 is a simplified schematic flow sheet of an embodiment of the process of the invention exemplifying preparation of ethyl acrylate from anhydrous acrylic acid and ethylene in the presence of sulfuric acid.

The process of the present invention as applied to the production of ethyl acrylate by the interaction of acrylic acid and ethylene is schematically represented in FIG. 1. Referring to such FIG. 1, in a spray tower 10 in which is maintained an atmosphere of gaseous ethylene as a continuous phase, there is sprayed a recycled liquid from an ethylation reactor 11 passed to spray tower 10 through line 12. There is thus accomplished in spray tower 10 a mass transfer of the ethylene into the liquid droplets of the recycled liquid from ethylation reactor 11. The ethylene is supplied to spray tower 10 by means of line 13, the ethylene flow into spray tower 10 preferably being in response to the pressure within spray tower 10. Generally speaking, the partial pressure of the ethylene within spray tower 10 should be maintained at greater than 100 psig, preferably 100 to 300 psig. The temperature within spray tower 10 should generally be within the range of about 100° to 160°C, preferably within the range of 110° to 130°C. The ethylene flow into the tower can either be intermittent or constant as long as the desired pressure is maintained. An alternative to supplying the ethylene separately to the spray tower itself is to introduce the ethylene into the liquid flowing through line 12 shortly before line 12 enters spray tower 10. If so done, some small amount of mass transfer of ethylene into the liquid may occur prior to spray tower 10, but such will not adversely affect the process and such will generally be negligible compared to the mass transfer taking place inside spray tower 10.

Depending upon the purity of the ethylene being supplied to spray tower 10, a blowdown of the gas in spray tower 10 might be required periodically in order to eliminate buildup of inerts or other undesired constituents. Although the possibility of a blowdown does exist, such has not actually been required in the inventor's experience with the process, even when a portion of the ethylene is recycled ethylene.

In constructing spray tower 10, conventional designs may be used, it being recommended that the tower be constructed of a material resistant to the black acid medium, such as Hastelloy C, which is a nickel base alloy containing about 15% of chromium and 15% of molybdenum. The spray tower should be of a size so as to allow the spraying of at least 0.4 volumes of liquid per volume of vapor space in the spray tower per minute. Generally the spray rate will be from 0.6 to 2.0 volumes, and preferably 0.7 to 1.2 volumes, of liquid per volume of vapor space per minute. There is preferably some small amount of liquid holdup at the bottom of spray tower 10 so as to provide a liquid seal to prevent the gaseous ethylene from escaping from the bottom of spray tower 10 through line 14 to ethylation reactor 11.

The ethylene enriched liquid obtained in spray tower 10 is passed to ethylation reactor 11, into which, by means of pump 30, there is also introduced through line 15 a substantially anhydrous sulfuric acid medium. This latter sulfuric acid medium is comprised of the residue, or bottoms from a product recovery zone as hereafter described (such sulfuric acid medium sometimes referred to in the industry as "black acid") along with make up sulfuric acid added through line 16. The "black acid" recovered as residue from the recovery zone is a mixture of various compounds and contains sulfuric acid, intermediate sulfates from the reaction of ethylene and sulfuric acid, unreacted acrylic acid, some small amounts of ethyl acrylate, as well as various other compounds.

In ethylation reactor 11, the main reaction of concern is the liquid phase reaction of the ethylene enriched liquid with sulfuric acid so as to obtain the various intermediate sulfate salts, such as ethyl hydrogen sulfate and diethyl sulfate, which will then further react with acrylic acid to form ethyl acrylate. Ethylation reactor 11 is also preferably constructed of a material resistant to the black acid medium such as Hastelloy C. It has been found that no mechanical stirrers inside such reactor are necessary for proper mixing of reactants, this being an advantage over similar processes which do require mechanical stirring. Adequate mixing of the reaction mixture in ethylation reactor 11 is accomplished by the high rate of recycle to spray tower 10 required in the present invention. The high rate of recycle of such is accomplished by pumping by means of pump 17 such liquid reaction mixture through line 12 to spray tower 10. In order to obtain adequate pickup of ethylene in spray tower 10, and to insure proper mixing in ethylation reactor 11, at least 0.6 volumes of the average liquid volume maintained in ethylation reactor 11 should be recycled per minute, for example 0.7 to 2.0 volumes per minute, and preferably 0.8 to 1.3 volumes per minute. Thus if the average amount of liquid in ethylation reactor 11 at any one time is about 100 gallons, then preferably from 80 to 130 gallons per minute would be recirculated through line 12.

The reaction mixture obtained in ethylation reactor 11 is withdrawn and passed through line 18 to esterification reactor 19 where glacial acrylic acid is added through line 20. Prior to being passed to esterification reactor 19, the average residence time of the liquid reactants fed (through line 15 and 16) to the loop composed of the ethylation reactor and the spray tower should generally be within the range of 8 to 20 minutes, preferably from 1 to 15 minutes. The temperature in the ethylation reactor should be maintained within the temperature range of about 100° to 160°C, although temperatures within the range of 110° to 130°C are preferred. The pressure within the esterification reactor should be from about 100 to 300 psig.

Esterification reactor 19 is also preferably constructed of a metal resistant to the black acid medium, such as Hastelloy C, and a means of agitation (such as a propeller) may be employed if desired. However it has not heretofore been found necessary to provide such agitation. The main function of esterification reactor 19 is to provide a reaction zone where the acrylic acid may react in the liquid phase with the intermediate sulfates to produce the desired ester, ethyl acrylate. The residence time of the reactants in the esterification reactor 19 should generally be within the range of 9 to 16 minutes, preferably 11 to 13 minutes. Temperatures within the esterification reaction zone should be maintained within the range of 100° to 150°C, preferably 110° to 130°C, and the pressure should be maintained within the range of 100 to 300 psig, preferably 130 to 200 psig.

Still referring to FIG. 1, the reaction mixture from esterification reactor 19 is withdrawn through line 21, passed through pressure reduction valve 22, and passed to product recovery tower 23. The distillation section of the product recovery tower that may be utilized in the process of the present invention may be of conventional design and may contain packing, sieve-type trays or bubble-cap trays. The distillation section should contain the equivalent of at least four theoretical trays. A vacuum is maintained on the distillation tower by conventional means such that the pressure is less than 200mm Hg absolute, preferably within the range of 20 to 150mm Hg absolute. The stillpot temperature should be maintained within the range of 100° to 170°C, preferably 110° to 130°C, and the stillhead temperature within the range of about 28° to 45°C, preferably 30° to 40°C.

The feed to product recovery tower 23 is preferably to the lower third, more preferably to the base, of the tower. In the tower 23, the light ends comprised mainly of ethyl acrylate and small amounts of unreacted ethylene and other uncondensibles are removed overhead through line 24, passed to condenser 25, and a crude ethyl acrylate product removed as bottoms through line 26. A stream comprising mainly unreacted ethylene is removed from the condenser through line 27 and may be disposed of or recycled as desired, although, if recycled, a scrubbing to remove sulfur oxides is recommended. As pointed out above, operation according to the present invention generally results in a very small amount of unreacted ethylene such that the amounts of ethylene removed through line 27 will be relatively small. The crude ethyl acrylate product recovered through line 26 may be further treated by conventional methods such as stabilization, water washing and further fractionation.

In operating product recovery tower 23, the residence time in the base of the tower should be as low as possible because at the temperatures required in the reboiler for vaporization some polymerization may occur. However, since, unlike similar processes, the stream fed to tower 23 is relatively lean in acrylic acid, there is not thought to be much esterification which takes place in the base of tower 23; and therefore a short residence time does not adversely affect yield and conversion as it does in prior art processes. It is pointed out that it is desirable to have a feed stream lean in acrylic acid being fed to the product recovery tower, such will result in less polymer formation.

Removed as bottoms or residue from product recovery tower 23 through line 15 is the black acid stream referred to above containing sulfuric acid, intermediate sulfates, unreacted acrylic acid, small amounts of ethyl acrylate, and the like. A blowdown of the bottoms stream is taken by means of line 28 so as to prevent the build-up of impurities in the system. The blowdown stream can be disposed of or may be treated by conventional methods for recovery of various products therefrom. For example the blowdown from line 28 could be treated so as to recover the acrylic acid and ethyl acrylate therefrom, and such recovered products recycled to the distillation section of tower 23.

The foregoing schematic flow sheet of FIG. 1 is but one embodiment of the present invention, and the process of the present invention can be accomplished in other types of equipment. For example the mass transfer function accomplished in spray tower 10, the ethylation function accomplished in ethylation reactor 11 and the esterification function of esterification reactor 19 may be accomplished in a single piece of equipment separated into three zones. A schematic diagram of such a piece of equipment is shown as apparatus 29 of FIG. 2, like numbers being used in FIGS. 1 and 2 to denote like functions. Thus in FIG. 2 there is depicted a single apparatus 29, having an upper chamber and a lower chamber separated by a baffle 30, such baffle having a central opening so as to allow liquids to flow from the upper chamber to the lower chamber. The upper portion of the upper chamber functions as a spray zone 10 wherein there is maintained an atmosphere of gaseous ethylene supplied through line 13. In this spray zone 10 there is accomplished the mass transfer of ethylene into the liquid droplets of recycled stream 12, the spray apparatus not being depicted. The lower portion of the upper chamber of apparatus 29, is an ethylation zone 11, wherein the ethylene enriched liquid from spray zone 10 reacts with the sulfuric acid medium supplied through line 15 (which would be the residue of the product recovery tower as depicted in FIG. 1), there being accomplished a high rate of recycle of the liquid in ethylation zone 11 by means of pump 17. The liquid level 31, of course, separates the ethylation zone 11 from the spray zone 10.

The reaction mixture from ethylation zone 11 passes through the opening in baffle 30 to esterification zone 19 where acrylic acid is added through line 20. The reaction mixture from the esterification zone 19 then passes to a separation zone (not shown) through line 21 for recovery of the crude ethyl acrylate. The use of a single apparatus as shown in FIG. 2 is preferred.

The following example is given in illustration of the present invention, but is not to be taken as limiting the scope thereof.

EXAMPLE I

Figure 2:
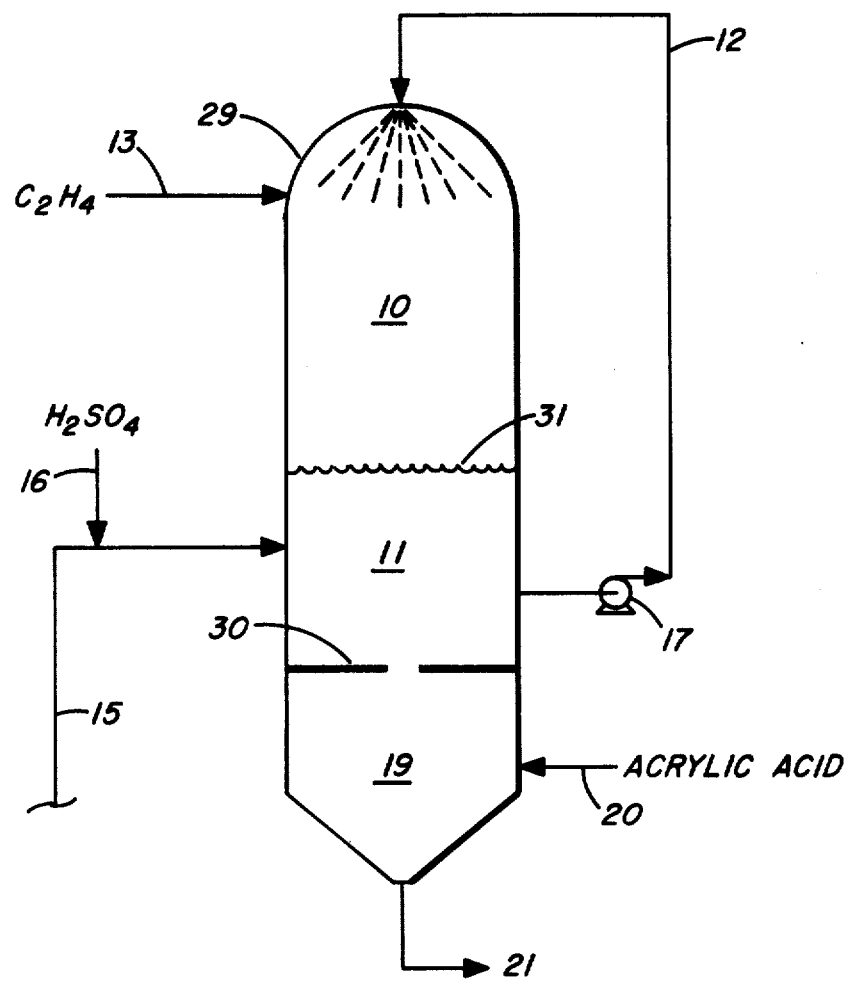
FIG. 2 is a schematic diagram of a single piece of apparatus which serves as a mass transfer zone, ethylation zone and esterification zone.

In this example ethyl acrylate was prepared from ethylene and acrylic acid in accordance with the present invention utilizing an apparatus as shown in FIG. 2 together with a product recovery tower as shown in FIG. 1. The apparatus of FIG. 2 was constructed of Hastelloy C and had an inside diameter of about 12 inches and a height of about 26 inches. The baffle 30 was located about 8 inches from the bottom of the apparatus and had a central, circular opening of about 0.5 inch to allow flow into lower esterification zone 19. The volume of lower esterification zone 19 was about 0.535 cubic feet. In the upper end of the apparatus was a solid cone spray nozzle which generated a circular spray pattern. The liquid level 31 was generally maintained approximately 9 inches above baffle 30 during continuous operation such that the volume of liquid maintained in ethylation zone 11 was about 0.575 cubic feet.

After start-up and under steady state conditions of continuous operation, ethylene gas was supplied on pressure demand through line 13 such that the pressure was maintained in spray zone 10 at about 150 psig, the temperature being approximately 127°C. The actual consumption of ethylene was about 3 pounds per hour. The black acid recycled through line 15 was fed to ethylation zone 11 at about 240 pounds per hour with about 1.4 pounds per hour of make-up sulfuric acid being added through line 16. Pump 17 was operated constantly such that from about 2,350 to 3,375 pounds per hour of the liquid in ethylation zone 11 was recycled through line 12. The temperature in ethylation zone 11 was maintained at about 127°C. It is pointed out that at the start-up of the continuous process herein described, ethylation zone 11 was charged with a mixture of acrylic acid and concentrated sulfuric acid. Although the reaction is exothermic in nature, a supply of heat was necessary to maintain the desired temperature because of the high surface to volume ratio of the experimental apparatus. In the unit described in this example no cooling was provided for ethylation zone 11, although in a larger commercial unit, some external cooling might be necessary because of the exothermic nature of the ethylation reaction.

Glacial acrylic acid was added through line 20 to esterification zone 19 at about 6.9 pounds per hour, and the reaction mixture from the esterification zone was withdrawn through line 21 at the rate of about 245 pounds per hour, such that the residence time of the reactants in esterification zone 19 was about 11 minutes. The temperature maintained in esterification zone 19 was about 127°C. The reaction mixture withdrawn through line 21 was passed through the pressure reduction valve 22 where the pressure was reduced from 150 psig and then flashed into the product recovery tower.

Product recovery tower 23 had an inside diameter of 6 inches and a 7.5 feet distillation tray section containing 15 sieve trays. The feed to the product recovery tower entered at the base of the tower. The tower was operated under vacuum at a pressure of 70mm Hg absolute with an overhead temperature of 34°C and a bottom temperature of 118°C. The overhead vapors removed from distillation tower 23 through line 24 were passed to condenser 25 operated at about 20°C and 70 mmHgA. Uncondensibles were removed through line 27, the make-up of such stream being mainly ethylene with smaller amounts of ethyl acrylate, water and diethyl ether. About 0.3 pound per hour of ethylene was removed through line 27. Removed as bottoms from condenser 25 through line 26 was the crude ethyl acrylate product, such being removed at the rate of about 9 pounds per hour. The analysis of the crude ethyl acrylate product was 97.4% ethyl acrylate, 0.3% sulfur dioxide, 0.5% water, 1.2% diethyl ether, 0.4% ethanol, and 0.2% acrylic acid, all such percentages being on a weight basis. Black acid was removed from the base of product recovery tower 23 at the rate of about 242 pounds per hour, about 2 pounds per hour of such being removed by a blow-down through line 28, the remainder being recirculated through line 15 to ethylation zone 11 by means of pump 30.

What is claimed is:

1. A continuous process for the production of a lower alkyl ester of an alpha-beta unsaturated monocarboxylic acid in which ester the alcohol moiety contains from 2 to 4 carbon atoms and in which ester the acid moiety contains 3 or 4 carbon atoms, which process comprises:
   a. in a mass transfer zone to which a gaseous alpha-monoolefin of 2 to 4 carbon atoms is supplied so as to maintain an atmosphere of said gaseous alpha-monoolefin as a continuous phase, effecting the mass transfer of said alpha-monoolefin into liquid droplets of a hereafter defined recycle stream recycled from the hereafter defined first reaction zone, so as to obtain an alpha-monoolefin enriched liquid,
   b. in a first reaction zone mixing and reacting the alpha-monoolefin enriched liquid so obtained in said mass transfer zone with a substantially anhydrous sulfuric acid medium, said sulfuric acid medium being substantially comprised of the residual liquid recycled from the hereafter defined recovery zone together with make-up sulfuric acid, said first reaction zone being operated at a temperature within the range of about 100° to 160°C, and at a pressure of about 100 to 300 psig,
   c. withdrawing a portion of the reaction mixture from said first reaction zone and recycling such as said recycle stream to the said mass transfer zone,
   d. passing the reaction mixture obtained from said first reaction zone to a second reaction zone, adding to and reacting with such reaction mixture obtained in said first reaction zone an anhydrous alpha-beta unsaturated monocarboxylic acid containing three or four carbon atoms, said second reaction zone being operated at a temperature within the range of about 100° to 150°C and a pressure within the range of about 100 to 300 psig,
   e. in a recovery zone treating the effluent from said second reaction zone so as to recover said lower alkyl ester of the alpha-beta unsaturated monocarboxylic acid therefrom, and
   f. recycling at least a portion of the residual liquid from said separation zone to said first reaction zone;

wherein said process is effected under substantially anhydrous conditions and wherein said process the rate of circulation and recirculation of the various streams therein is such that the residence time of the liquid reactants in the loop comprised of said first reaction zone and said mass transfer zone is from 8 to 20 minutes, and such that the residence time of the reactants in said second reaction zone is from 9 to 16 minutes.

2. The process of claim 1 wherein in said mass transfer zone there is sprayed from 0.6 to 2.0 volumes of liquid per volume of vapor space in said mass transfer zone per minute, wherein the partial pressure of ethylene in said mass transfer zone is maintained at at least 100 psig, wherein the temperature within said mass transfer zone is maintained within the range of about 100° to 160°C, and wherein there is recycled from said first reaction zone to said mass transfer zone from 0.7 to 2.0 volumes of the average liquid volume maintained in said first reaction zone per minute.

3. The process of claim 1 wherein in said separation zone said lower alkyl ester is recovered by distillation of the portion of said effluent of second reaction zone passed to said separation zone under a vacuum below about 200mm Hg absolute, with a stillpot temperature within the range of about 100° to 170°C and a still head temperature of 28° to 45°C, said lower alkyl ester being recovered from the overheads of said distillation, and the bottoms of said distillation being said residual liquid which is recycled to the first reaction zone.

4. The process of claim 1 wherein said alpha monoolefin is ethylene, wherein said monocarboxylic acid is acrylic acid and wherein said lower alkyl ester is ethyl acrylate.

5. The process of claim 2 wherein said alpha monoolefin is ethylene, wherein said monocarboxylic acid is acrylic acid and wherein said lower alkyl ester is ethyl acrylate.

6. The process of claim 3 wherein said alpha monoolefin is ethylene, wherein said monocarboxylic acid is acrylic acid and wherein said lower alkyl ester is ethyl acrylate.

7. A continuous process for the production of ethyl acrylate from ethylene and acrylic acid, which process comprises:
   a. in a mass transfer zone maintained at a temperature within the range of 110° to 130°C and to which gaseous ethylene is supplied so as to maintain an atmosphere of said gaseous ethylene as a continuous phase, effecting the mass transfer of said ethylene into liquid droplets of a hereafter defined recycle stream recycled from the hereafter defined first reaction zone, so as to obtain an ethylene enriched liquid, the partial pressure of ethylene within said mass transfer zone being maintained at from 100 to 300 psig, b. in a first reaction zone mixing and reacting the ethylene enriched liquid so obtained in said mass transfer zone with a substantially anhydrous sulfuric acid medium, said sulfuric acid medium being substantially comprised of the residual liquid recycled from the hereafter defined recovery zone together with make-up sulfuric acid, said first reaction zone being operated at a temperature within the range of about 110° to 130°C, and at a pressure of about 100 to 300 psig, c. withdrawing a portion of the reaction mixture from said first reaction zone and recycling such as said recycle stream to the said mass transfer zone, there being recycled from 0.8 to 1.3 volumes of the average liquid volume in said first reaction zone recycled per minute to said mass transfer zone, d. passing the reaction mixture obtained from said first reaction zone to a second reaction zone, adding to and reacting with such reaction mixture obtained in said first reaction zone anhydrous acrylic acid, said second reaction zone being operated at a temperature within the range of about 110° to 130°C and a pressure within the range of about 130 to 300 psig, e. in a recovery zone treating the effluent from said second reaction zone so as to recover ethyl acrylate therefrom, and f. recycling at least a portion of the residual liquid from said separation zone to said first reaction zone;

wherein said process is effected under substantially anhydrous conditions, wherein the rate of circulation and recirculation of the various streams therein is such that the residence time of the liquid reactants in the loop comprised of said first reaction zone and said mass transfer zonee is from 11 to 15 minutes, where the residence time of the reactants in said second reaction zone is from 11 to 13 minutes, and wherein there is sprayed in said mass transfer zone from 0.7 to 1.2 volumes of liquid per volume of vapor space in said mass transfer zone per minute.

8. The process of claim 7 wherein in said separation zone said ethyl acrylate is recovered by distillation of the portion of said effluent of second reaction zone passed to said separation zone under a vacuum below about 200mm Hg absolute, with a stillpot temperature within the range of about 100° to 170°C and a still head temperature of 28 to 45°C, said ethyl acrylate being recovered from the overheads of said distillation, and the bottoms of said distillation being said residual liquid which is recycled to the first reaction zone.

* * * * *

UNITED STATES PATENT OFFICE
CERTIFICATE OF CORRECTION

PATENT NO. : 3,894,076

DATED : July 8, 1975

INVENTOR(S) : Roger L. Van Duyne, Adolfo Aguilo, Dudley J. McCracken

It is certified that error appears in the above-identified patent and that said Letters Patent are hereby corrected as shown below:

In column 2, line 55, after "is preferred" delete "preferred;" and insert therefor -- or --.

In column 4, line 32, for "1 to 15" read -- 11 to 15 --.

In column 10, line 12, for "zonee" read -- zone --.

Signed and Sealed this sixteenth Day of September 1975

[SEAL]

Attest:

RUTH C. MASON
Attesting Officer

C. MARSHALL DANN
Commissioner of Patents and Trademarks